(12) United States Patent
Lee

(10) Patent No.: US 8,439,172 B2
(45) Date of Patent: May 14, 2013

(54) OIL DAMPER USING A CAM

(75) Inventor: Byung Wook Lee, Anyang-si (KR)

(73) Assignee: Samhong Tech Co., Ltd. (KR)

( * ) Notice: Subject to any disclaimer, the term of this patent is extended or adjusted under 35 U.S.C. 154(b) by 60 days.

(21) Appl. No.: 13/376,680

(22) PCT Filed: Jun. 7, 2010

(86) PCT No.: PCT/KR2010/003646
§ 371 (c)(1),
(2), (4) Date: Dec. 7, 2011

(87) PCT Pub. No.: WO2010/143854
PCT Pub. Date: Dec. 16, 2010

(65) Prior Publication Data
US 2012/0080278 A1    Apr. 5, 2012

(30) Foreign Application Priority Data
Jun. 8, 2009  (KR) .......................... 10-2009-0050288

(51) Int. Cl.
*A47K 13/04*   (2006.01)
(52) U.S. Cl.
USPC .................. 188/290; 4/236; 4/248; 16/330
(58) Field of Classification Search .................. 188/283, 188/288, 290, 305, 316; 4/236, 248; 16/303, 16/330, 342
See application file for complete search history.

(56) References Cited

U.S. PATENT DOCUMENTS

| 5,153,946 | A  | * | 10/1992 | Yoke et al. ......................... 4/248 |
| 5,884,734 | A  | * | 3/1999  | Hiramoto et al. ........ 188/322.18 |
| 5,906,010 | A  |   | 5/1999  | Suzuki |
| 6,178,597 | B1 | * | 1/2001  | Suzuki et al. ................... 16/330 |
| 6,634,033 | B2 | * | 10/2003 | Mizuno et al. .................... 4/248 |
| 7,798,296 | B2 |   | 9/2010  | Iwashita |

FOREIGN PATENT DOCUMENTS

| JP | 10-248757     | 9/1998  |
| JP | 2006-112538   | 4/2006  |
| KR | 20-0364759    | 10/2004 |
| KR | 10-2005-0108974 | 11/2005 |

OTHER PUBLICATIONS

International Search Report—PCT/KR2010/003646 dated Oct. 14, 2010.

* cited by examiner

*Primary Examiner* — Christopher Schwartz
(74) *Attorney, Agent, or Firm* — Cantor Colburn LLP

(57) ABSTRACT

The present invention relates to an oil damper for preventing a seat and a cover from rapidly rotating. The oil damper includes a shaft unit, a cam, a valve, an elastic member, a housing and a fastening member. The shaft unit has a coupling part which is coupled to the seat and the cover. The cam is rotatably coupled to a rotating shaft of the shaft unit. The valve opens or closes a coupling hole depending on movement of the cam to allow fluid to flow through the coupling hole or prevent the fluid from flowing. The elastic member is provided in the housing and is compressed by the cam. A flow rate control groove is formed in the housing and controls the flow rate of fluid in response to movement of the cam. The fastening member is fitted over the shaft unit and fastened to the housing.

6 Claims, 10 Drawing Sheets

OIL DAMPER USING A CAM

TECHNICAL FIELD

The present invention relates to an oil damper using a cam which can prevent a seat and/or a cover, which is rotatably mounted to a bidet or toilet, from rapidly rotating downwards, thus prevent the elements from being damaged.

BACKGROUND ART

Generally, a seat is placed on the upper surface of a toilet bowl and allows a user to sit thereon, and a cover covers the seat. The seat and the cover are hinged to a bidet or toilet. In such a construction, the seat and/or cover may rotate downwards around the hinge and fall freely, for example, because of the carelessness of a user. In this case, the seat strikes the toilet bowl, and the cover strikes the seat, thus applying a comparatively strong impact to the elements. Also, noise is generated thereby and the elements may be damaged which reduces the lifetime of the product.

In an effort to overcome the above-mentioned problems, oil dampers have recently been used. Such oil dampers have a pair of blades that rotate along with a rotating shaft from a first side to a second side in the space of a housing. During the rotation of the blades, viscous fluid moves from the first side to the second side of the space through a fluid passage. The blades function as factors which resist to the viscous fluid, thus generating damping force.

However, because of the nature of this conventional oil damper, the number of elements is comparatively large, and the assembly process is complex, reducing the productivity and increasing the production cost. Thus, the conventional oil damper is economically infeasible. Further, the oil damper is sensitive to temperature change, because the viscosity of the viscous fluid easily varies depending on the environmental change. There are problems in that the rotating speed of the seat and cover may sharply vary depending on the variation of the viscosity of the viscous fluid and the amount of viscous fluid injected into the housing.

If the damping force of the oil damper is too strong to apply just a little impact to the seat and cover, the rotating speed of the seat and cover becomes excessively slow. On the other hand, if the rotating speed of the seat and cover is comparatively high, the oil damper cannot sufficiently eliminate the impact applied to the seat and cover. In addition, unless the user lifts the seat and cover by a predetermined angle (for example, 60°), the damping force may not be generated, because a sufficient amount of oil cannot move.

To solve the above problems, a spring damper using an elastic member, such as a spring or the like, was recently proposed. However, the elastic force of the elastic member is reduced as it is used repeatedly over time. Therefore, the damping force of the damper does not stay constant. Further, there is the disadvantage of the elastic member making a noise.

DISCLOSURE

Technical Problem

Accordingly, the present invention has been made keeping in mind the above problems occurring in the prior art, and an object of the present invention is to provide an oil damper using a cam which is configured such that when a seat and/or cover opens, it can be rapidly and easily rotated by the repulsive force of a spring, and when the seat and/or cover is closed, fluid which flows in response to movement of the cam works with the spring to generate a force of resistance which is required to reduce the rotating speed of the seat and/or cover which is being closed, so that the seat and/or cover can smoothly rotate.

Another object of the present invention is to provide an oil damper using the cam in which even though a user lifts the seat and/or cover by less than a predetermined angle and releases it so that a sufficient amount of oil does not move, a sufficient amount of damping force can be generated by the spring which is compressed while the seat and/or cover is closed.

Technical Solution

In order to accomplish the above objects, the present invention provides an oil damper for preventing a seat and a cover from rapidly rotating, including: a shaft unit having a coupling part coupled to the seat and the cover, and a rotating depression coupled to a rotating protrusion of a housing, the shaft unit rotating to move a cam; the cam rotatably coupled to a rotating shaft of the shaft unit so that when the shaft unit rotates in a direction, the cam moves along a cam part of the shaft unit and compresses an elastic member; a valve provided around the rotating shaft of the shaft unit, the valve opening or closing a coupling hole depending on movement of the cam to allow fluid to flow through the coupling hole or prevent the fluid from flowing through the coupling hole; the elastic member provided around the rotating protrusion in the housing, the elastic member being compressed by the cam, thus generating a repulsive force; the housing coupled to the shaft unit, the housing having the rotating protrusion around which the elastic member is provided, with a flow rate control groove formed in the housing, the flow rate control groove configured to control a flow rate of fluid in response to the movement of the cam; and a fastening member fitted over the shaft unit and fastened to the housing.

Advantageous Effects

In an oil damper using a cam according to the present invention, when a seat and/or cover opens, it can be rapidly and easily rotated by the repulsive force of a spring. When the seat and/or cover is closed, fluid which flows in response to movement of the cam works with the spring to generate a force of resistance which is required to reduce the rotating speed of the seat and/or cover which is being closed, so that the seat and/or cover can smoothly rotate. Therefore, the damping force can be increased, thus reducing noise and impact generated when the seat and/or cover collides with the upper surface of a toilet bowl. Thereby, the lifetime of a product can be extended.

Furthermore, in the oil damper using the cam according to the present invention, even though a user lifts the seat and/or cover by less than a predetermined angle (for example, by about 30° to 40°) and releases it, a sufficient amount of damping force can be generated by compressing the spring. Therefore, the reliability of the product can be enhanced.

Figure 1:
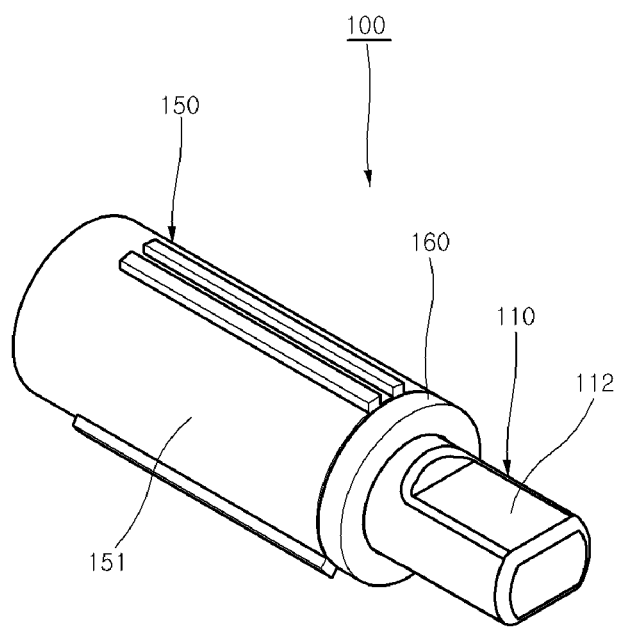
FIG. 1 is a perspective view of the present invention.

*Description of the Reference Numerals in the Drawings*

| 100: oil damper | 110: shaft unit |
|---|---|
| 120: cam | 130: valve |
| 140: elastic member | 150: housing |
| 160: fastening member | 170: friction prevention ring |

BEST MODE

Figure 2:
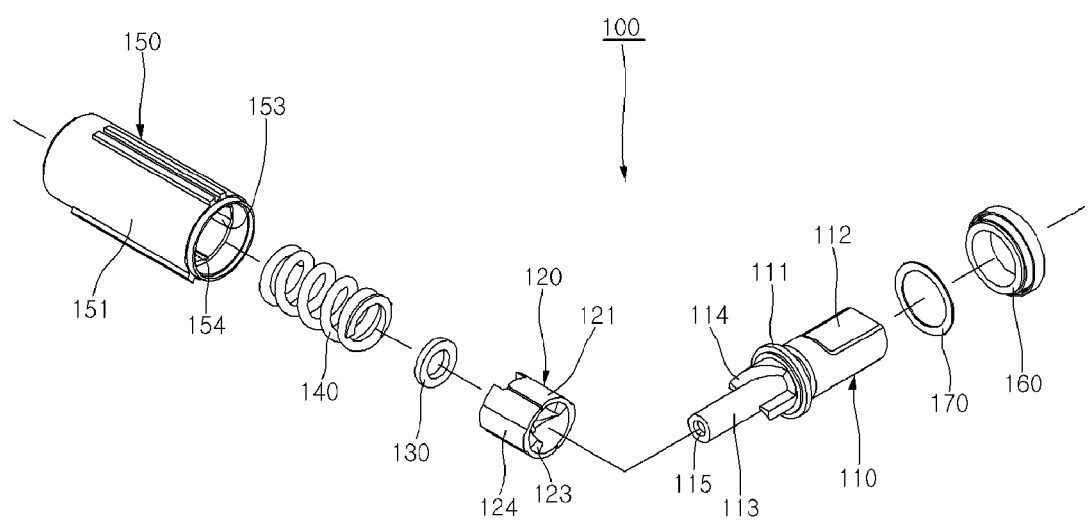
FIG. 2 is an exploded perspective view of the present invention.
Figure 3:
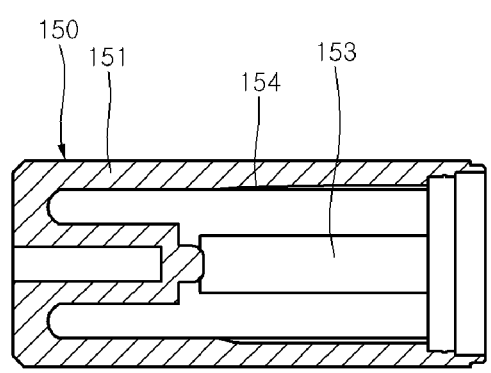
FIGS. 3 and 4 are sectional views showing a housing of the present invention.
Figure 4:
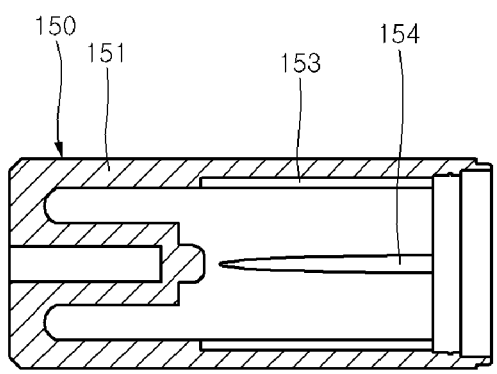
Figure 5:
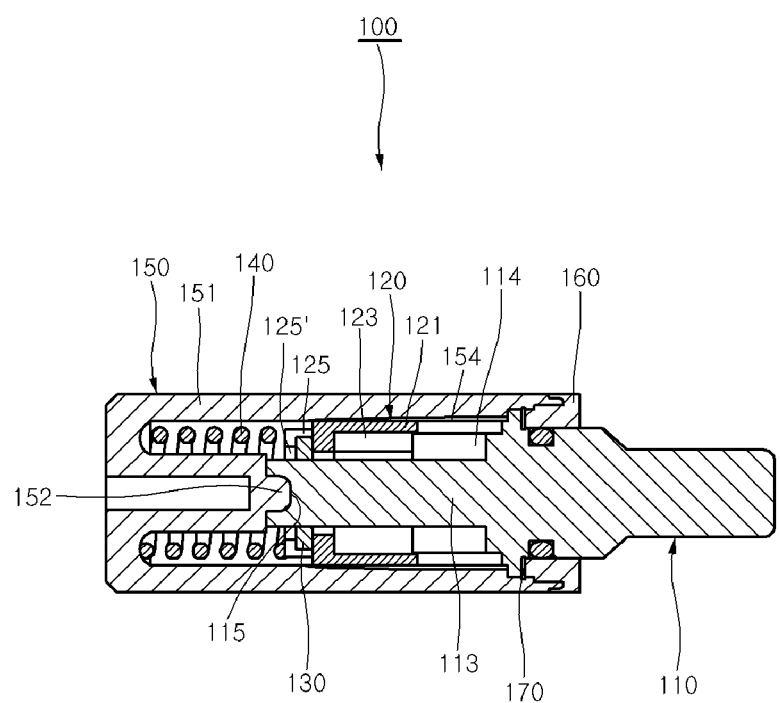
FIG. 5 is a sectional view of the present invention.

Hereinafter, an embodiment of the present invention will be described in detail with reference to the attached drawings. FIG. 1 is a perspective view of the present invention. FIG. 2 is an exploded perspective view of the present invention. FIG. 5 is a sectional view of the present invention.

An oil damper 100 using a cam according to the present invention prevents a seat and/or a cover from rapidly rotating. The oil damper 100 includes a shaft unit 110, a cam 120, a valve 130, an elastic member 140, a housing 150 and a fastening member 160. The shaft unit 110 has a coupling part 112 which is coupled to the seat and the cover, and a rotating depression 115 which receives therein a rotating protrusion 152 of the housing 150. The shaft unit 110 rotates and moves the cam 120. The cam 120 is movably coupled to a rotating shaft 113 of the shaft unit 110. The cam 120 is moved along a cam part 114 of the shaft unit 110 by rotating the shaft unit 110, thus compressing the elastic member 140. The valve 130 is coupled to the rotating shaft 113 of the shaft unit 110 and opens or closes a coupling hole 122 depending on the movement of the cam 120 to allow the fluid to flow through the coupling hole 122 or prevent the fluid from flowing through it. The elastic member 140 is provided around the rotating protrusion 152 in the housing 150 and generates a repulsive force when the cam 120 compresses the elastic member 140. The housing 150 is coupled to the shaft unit 110 and has the rotating protrusion 152 around which the elastic member 140 is provided, and a flow rate control groove 154 which is configured such that the flow rate of fluid varies in response to the movement of the cam 120. The fastening member 160 is fitted over the shaft unit 110 and fastened to the housing 150. The construction of the oil damper 100 will be explained in more detail below.

The shaft unit 110 has at a first side thereof the coupling part 112 which is coupled to the seat and the cover. A support protrusion 111 is provided around a portion of the coupling part 112. The rotating shaft 113 is provided at a second side of the shaft unit 110 and protrudes in a direction opposing the coupling part 112 relative to the support protrusion 111. The cam part 114 is provided on the second side of the shaft unit 110 relative to the support protrusion 111. The cam part 114 functions to move the cam 120. The rotating depression 115 is formed in the end of the rotating shaft 113.

The cam 120 includes a cam body 121 through which the coupling hole 122 is formed, so that the cam 120 is provided around the rotating shaft 113 of the shaft unit 110 through the coupling hole 122. A cam part 123 is provided on a circumferential inner surface of the cam body 121 and comes into surface contact with the cam part 114 of the shaft unit 110. A rotation prevention protrusion 124 is provided on a circumferential outer surface of the cam body 121 to prevent the cam body 121 from rotating. A receiving rib 125 protrudes from a second side of the cam body 121 and defines a space 125' which receives the valve 130 therein.

Preferably, the diameter of the coupling hole 122 of the cam 120 is greater than the diameter of the rotating shaft 113 of the shaft unit 110 but less than the diameter of the valve 130.

The housing 150 includes a housing body 151 which is open on one end thereof. The rotating protrusion 152 protrudes from an inner surface of the housing body 151 and is inserted into the rotating depression 115 of the shaft unit 110. A rotation prevention groove 153 is formed in a circumferential inner surface of the housing body 151. The rotation prevention protrusion 124 of the cam 120 is inserted into the rotation prevention groove 153. The flow rate control groove 154 which is configured to control the flow rate of fluid is formed in the circumferential inner surface of the housing body 151.

The flow rate control groove 154 is configured such that the width and depth thereof are reduced from the outer end of the housing body 151 of the housing 150 to the inner end thereof.

Furthermore, the present invention further includes a friction prevention ring 170 which prevents friction from being generated between the shaft unit 110 and the fastening member 160 when the shaft unit 110 rotates.

Hereinafter, the assembly and installation of the present invention having the above-mentioned construction will be described.

First, the cam body 121 of the cam 120 is coupled to the rotating shaft 113 of the shaft unit 110. In detail, the rotating shaft 113 is inserted into the coupling hole 122 which is formed through the cam body 121, and a top surface of the cam part 123 of the cam 120 comes into surface contact with a contact surface of the cam part 114 of the shaft unit 110.

After the cam 120 has been coupled to the rotating shaft 113 of the shaft unit 110, the valve 130 is coupled to the rotating shaft 113. Subsequently, the valve 130 is moved into the receiving rib 125 so that the valve 130 comes into close contact with the cam body 121 and closes the coupling hole 122.

Here, because the valve 130 is disposed in the space 125' of the receiving rib 125, it is prevented from protruding out of the receiving rib 125.

The elastic member 140 is installed in the housing body 151 of the housing 150 the one end of which is open. The elastic member 140 receives therein the rotating protrusion 152 which protrudes into the housing body 151. Subsequently, after the rotation prevention protrusion 124 of the cam 120 is aligned with the rotation prevention groove 153 of the housing 150, the rotating shaft 113 of the shaft unit 110 to which the valve 130 and the cam 120 are coupled are inserted into the housing body 151 of the housing 150.

Here, the rotation prevention protrusion 124 of the cam 120 is inserted into the rotation prevention groove 153 of the housing 150, while the valve 130, the cam 120 and the rotating shaft 113 are inserted into the housing body 151 of the housing 150. Also, the rotating depression 115 of the rotating shaft 113 is coupled to the rotating protrusion 152 of the housing 150. During this process, the cam body 121 of the cam 120 is filled with fluid. When the shaft unit 110 is inserted into the housing body 151, the cam body 121 of the cam 120 compresses the elastic member 140 so that the repulsive force is generated by the elastic member 140. Further, the support protrusion 111 of the shaft unit 110 is seated onto a stopper 151' of the housing 150, thus closing the interior of the housing body 151 of the housing 150.

After the support protrusion 111 of the shaft unit 110 is seated onto the stopper 151' of the housing 150 so that the housing body 151 is completely closed, the friction prevention ring 170 is fitted over the coupling part 112 of the shaft unit 110 and is brought into close contact with the support protrusion 111. Thereafter, the fastening member 160 is fitted over the coupling part 112 and fastened to the housing body 151 of the housing 150 so that the shaft unit 110 can be prevented from being removed from the housing 150, thus completing the assembly of the oil damper 100.

Preferably, an O-ring is provided around the coupling part 112 of the shaft unit 110 and brought into contact with the circumferential inner surface of the fastening member 160 so that the fluid can be prevented from leaking out.

Figure 6:
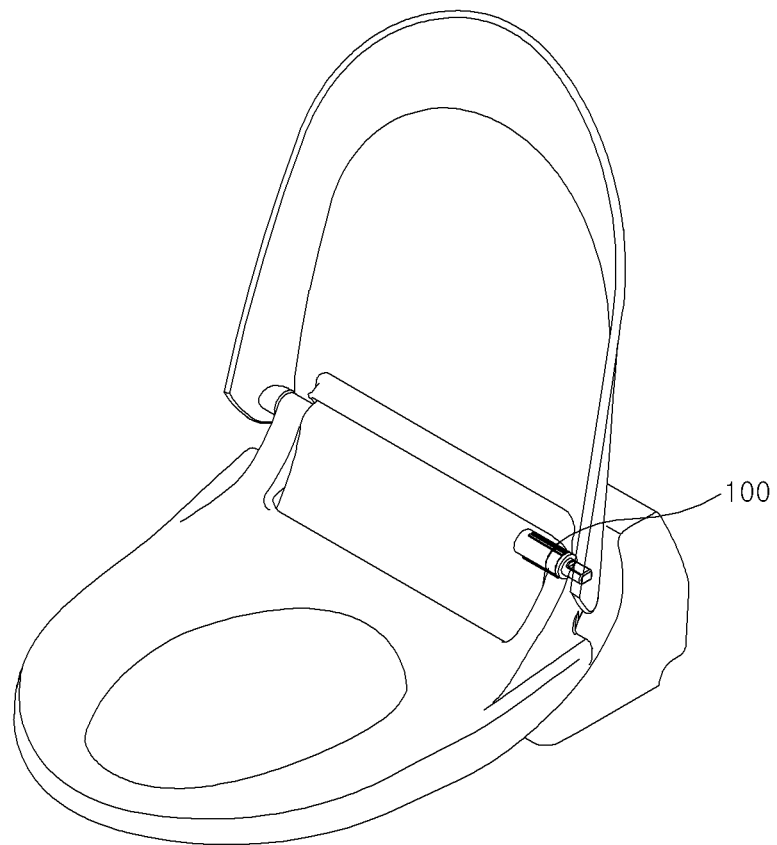
FIG. 6 is a view illustrating the installation of the present invention.

As shown in FIG. 6, the oil damper 110 of the present invention which has been assembled by the above-mentioned process is installed in a bidet in such a way that the housing 150 is fixed in a main body of the bidet so as not to be rotatable and the coupling part 112 of the shaft unit 110 is coupled to the seat and the cover. The seat and the cover must be able to come into close contact with an upper surface of a toilet bowl.

Figure 7:
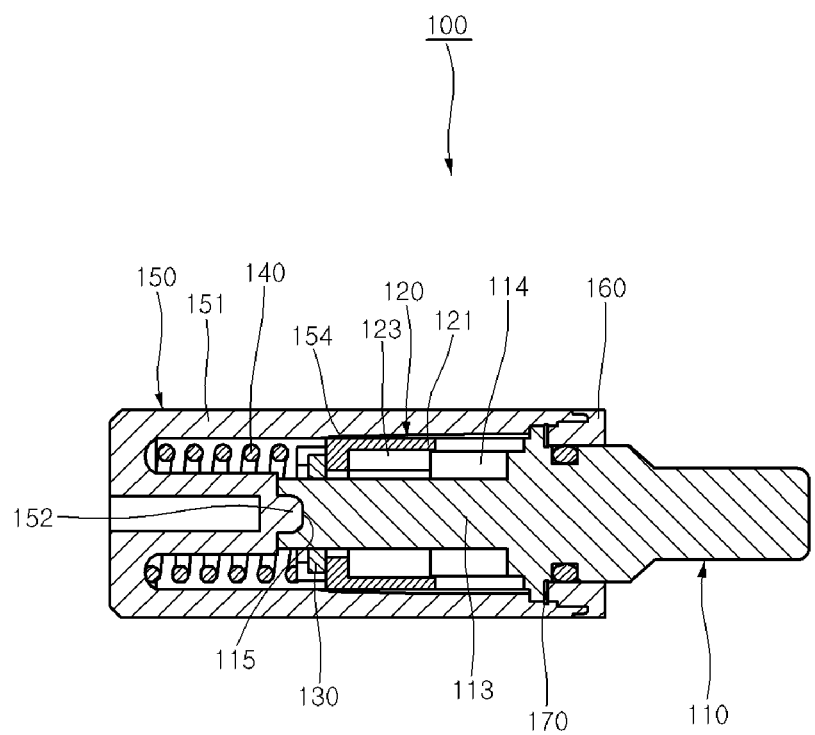
FIGS. 7 and 8 are views illustrating the operation of the present invention when a seat rotates upwards.
Figure 8:
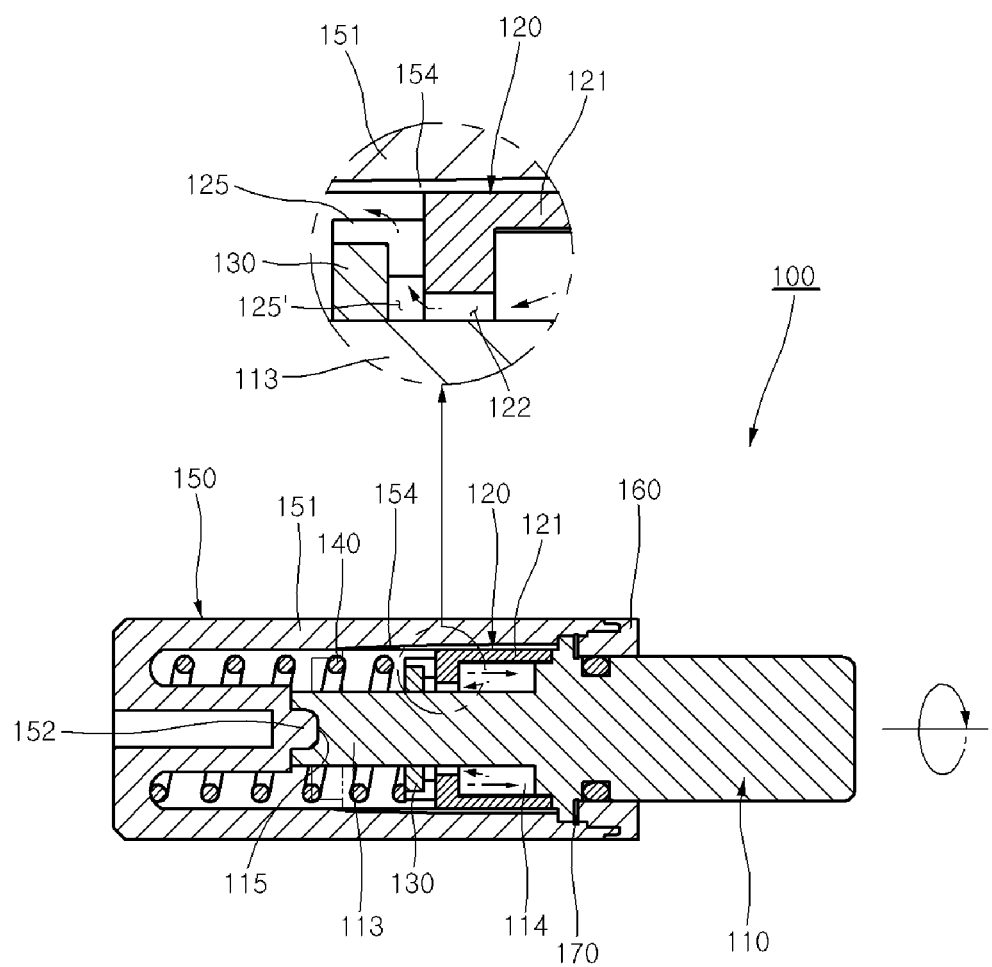

In this state, when the user rotates the cover upwards, as shown in FIGS. 7 and 8, the coupling part 112 which is coupled to the cover is rotated in a normal direction so that the shaft unit 110 which has the rotating depression 115 coupled to the rotating protrusion 152 of the housing 150 is rotated in the normal direction.

When the shaft unit 110 rotates in the normal direction so that the contact surface of the cam part 114 becomes displaced from the top surface of the cam part 123 of the cam 120, the restoring force of the elastic member 140 which has been compressed pushes the receiving rib 125 of the cam 120, thus moving the cam body 121 of the cam 120 towards the shaft unit 110. Upon the movement of the cam body 121 of the cam 120 towards the shaft unit 110, the coupling hole 122 of the cam 120 which has been closed by the valve 130 opens. Simultaneously, the fluid which has been in the cam body 121 of the cam 120, that is, in a first side of the housing body 151 of the housing 150, rapidly moves through the space between the open coupling hole 122 and the rotating shaft 113 to a second side of the housing body 151 of the housing 150 in which the elastic member 140 is disposed, thus allowing the cover to smoothly rotate upwards.

To allow the fluid to move, the diameter of the coupling hole 122 must be greater than that of the rotating shaft 113 but less than that of the valve 130.

When the cam body 121 of the cam 120 moves a predetermined distance towards the shaft unit 110, the valve 130 which is coupled to the rotating shaft 113 of the shaft unit 110 is disposed at a position at which the surface of the valve 130 is flush with the surface of the receiving rib 125. Thus, the elastic member 140 pushes not only the receiving rib 125 but also the valve 130. Simultaneously, while surface contact is maintained between the curved surface of the cam 120 which is moving towards the shaft unit 110 and the curved surface of the shaft unit 110 which is rotating in the normal direction, the rotation prevention protrusion 124 of the cam 120 moves along the rotation prevention groove 153 of the housing 150. Therefore, the cam 120 moves horizontally.

Furthermore, some of the fluid which has been in the cam body 121 of the cam 120 moves into the housing body 151 of the housing 150 through the flow rate control groove 154 which is formed in the circumferential inner surface of the housing body 151 of the housing 150, but the amount of this fluid is too small to limit the movement of the cam 120.

The cam 120 is moved towards the shaft unit 110 by the restoring force of the elastic member 140 under the guidance of the rotation prevention protrusion 124 along the rotation prevention groove 153 until a bottom surface of the cam part 123 of the cam 120 comes into contact with a bottom surface of the shaft unit 110, that is, with the support protrusion 111. While the shaft unit 110 rotates, the cover coupled to the coupling part 112 of the shaft unit 110 opens the toilet bowl and allows the user to sit on the seat and relieve him/herself.

Here, making the contact of the bottom surface of the cam part 123 with the bottom surface of the shaft unit 110, that is, with the support protrusion 111, means that the cover has rotated by 90° or more upwards. The friction prevention ring 170 which is in contact with the fastening member 160 prevents friction from being generated between the shaft unit 110 and the fastening member 160 when the shaft unit 110 rotates.

Figure 9:
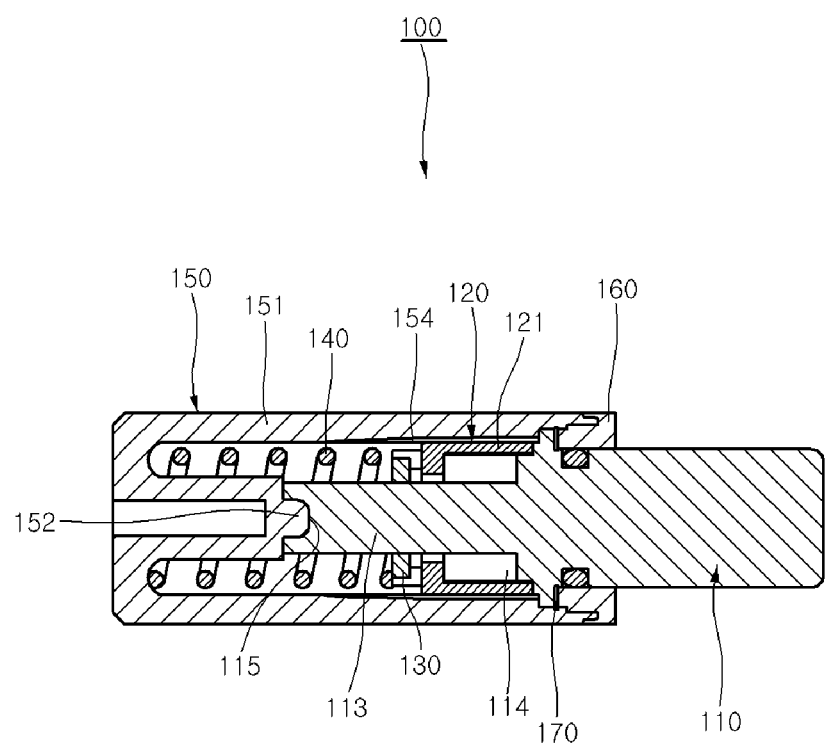
FIGS. 9 and 10 are views illustrating the operation of the present invention when a seat rotates downwards.
Figure 10:
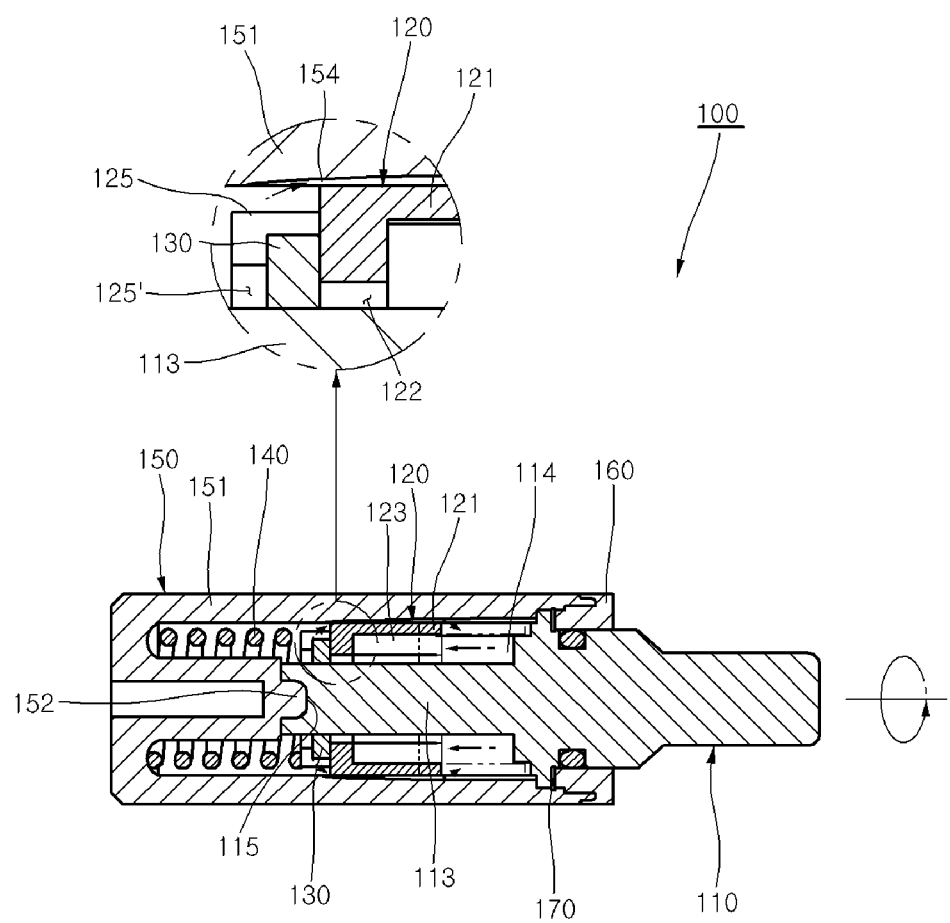

If the user rotates the cover downwards to close the toilet bowl after the user has relieved him/herself and flushed the toilet or while flushing the toilet, as shown in FIGS. 9 and 10, the coupling part 112 coupled to the cover is rotated in the reverse direction by the downward rotation of the cover so that the shaft unit 110 which has the rotating depression 115 coupled to the rotating protrusion 152 of the housing 150 is rotated in the reverse direction.

When the shaft unit 110 rotates in the reverse direction, the bottom surface of the cam part 123 of the cam 120 moves away from the bottom surface of the cam part 114 of the shaft unit 110, that is, from the support protrusion 111, and a curved surface of the cam part 123 comes into contact with a curved surface of the cam part 114. Further, while the curved surface of the cam 120 is maintained in surface contact with the curved surface of the shaft unit 110, the curved surface of the shaft unit 110, which is rotating in the reverse direction, pushes the cam 120 towards the inner end of the housing body 151 of the housing 150 under the guidance of the rotation prevention groove 153 of the housing 150 along which the rotation prevention protrusion 124 of the cam 120 moves.

While the cam body 121 of the cam 120 moves towards the inner end of the housing body 151 of the housing 150, the receiving rib 125 of the cam 120 compresses the elastic member 140 and moves a predetermined distance, then the coupling hole 122 of the cam 120 is brought into contact with and closed by the valve 130 which is disposed in the space 125' of the receiving rib 125.

The cam 120 pushes the valve 130, which has closed the coupling hole 122, along the rotating shaft 113 towards the inner end of the housing body 151 of the housing 150. Thus, the coupling hole 122 can be maintained in the closed state. Since the coupling hole 122 is closed, fluid which has been in the second side of the housing body 151 of the housing 150 can move to the first side of the housing body 151 of the housing 150 only through the flow rate control groove 154.

Here, the width and depth of the flow rate control groove 154 are reduced from the first side of the housing body 151 to the second side, that is, from the outer end of the housing body 151 to the inner end. Therefore, as the cam 120 moves along the curved surface of the shaft unit 110 towards the inner end of the housing body 151, the area of the opening of the flow rate control groove 154 is reduced so that the flow rate of fluid is reduced, thus absorbing the rotating force of the cover, thereby reducing the rotating speed of the cover.

Moreover, while the cam 120 moves along the curved surface of the shaft unit 110 towards the inner end of the housing body 151 of the housing 150, the receiving rib 125 of the cam 120 compresses the elastic member 140. The repulsive force generated while compressing the elastic member 140 also absorbs the rotating force of the cover so that the cover can rotate more slowly, thus preventing the cover from striking the seat.

Eventually, the top surface of the cam part 114 of the shaft unit 110 which rotates downwards along the cover comes into close contact with the top surface of the cam part 123 of the cam 120, thereby being put in standby for the next operation.

Although the present invention has been disclosed with reference to the preferred embodiment and drawings, the terms and words used in the specification and claims are not necessarily limited to typical or dictionary meanings, but must be interpreted as having meanings and concepts adapted to the scope and sprit of the present invention. Therefore, those skilled in the art will appreciate that the construction proposed in the embodiment and drawings of the specification is only one example illustrating the present invention, and various modifications, additions and substitutions are possible, without departing from the scope and spirit of the invention as disclosed in the accompanying claims.

The invention claimed is:

1. An oil damper for preventing a seat and a cover from rapidly rotating, comprising:
   a shaft unit having a coupling part coupled to the seat and the cover, and a rotating depression coupled to a rotating protrusion of a housing, the shaft unit rotating to move a cam;
   the cam rotatably coupled to a rotating shaft of the shaft unit so that when the shaft unit rotates in a direction, the cam moves along a cam part of the shaft unit and compresses an elastic member;
   a valve provided around the rotating shaft of the shaft unit, the valve opening or closing a coupling hole depending on movement of the cam to allow fluid to flow through the coupling hole or prevent the fluid from flowing through the coupling hole;
   the elastic member provided around the rotating protrusion in the housing, the elastic member being compressed by the cam, thus generating a repulsive force;
   the housing coupled to the shaft unit, the housing having the rotating protrusion around which the elastic member is provided, with a flow rate control groove formed in the housing, the flow rate control groove configured to control a flow rate of fluid in response to the movement of the cam; and
   a fastening member fitted over the shaft unit and fastened to the housing.

2. The oil damper according to claim 1, wherein the shaft unit comprises:
   the coupling part provided at a first side of the shaft unit and coupled to the seat and the cover, with a support protrusion provided around a portion of the coupling part; the rotating shaft provided on a second side of the shaft unit relative to the support protrusion; the cam part provided on the second side of the shaft unit relative to the support protrusion, the cam part moving the cam; and the rotating depression formed in an end of the rotating shaft.

3. The oil damper according to claim 1, wherein the cam comprises:
   the coupling hole formed through a cam body in one direction so that the cam is provided around the rotating shaft of the shaft unit through the coupling hole; the cam part provided on a circumferential inner surface of the cam body, the cam part coming into surface contact with the cam part of the shaft unit; a rotation prevention protrusion provided on a circumferential outer surface of the cam body to prevent the cam body from rotating; and a receiving rib protruding from a second side of the cam body and defining a space for receiving the valve therein.

4. The oil damper according to claim 3, wherein a diameter of the coupling hole of the cam is greater than a diameter of the rotating shaft of the shaft unit and smaller than a diameter of the valve.

5. The oil damper according to claim 1, wherein the housing comprises:
   a housing body being open on one end thereof, with the rotating protrusion protruding from the housing body, the rotating protrusion coupled to the rotating depression of the shaft unit; a rotation prevention groove formed in a circumferential inner surface of the housing body, the rotation prevention groove being connected to a rotation prevention protrusion of the cam; and the flow rate control groove formed in the circumferential inner surface of the housing body, the flow rate control groove configured to control the flow rate of fluid.

6. The oil damper according to claim 5, wherein the flow rate control groove is configured such that width and depth thereof are reduced from an outer end of the housing body to an inner end thereof.

* * * * *